United States Patent
Kim (10) Patent No.: US 10,001,841 B2
(45) Date of Patent: Jun. 19, 2018

(54) MAPPING TYPE THREE-DIMENSIONAL INTERACTION APPARATUS AND METHOD

(71) Applicant: ELECTRONICS AND TELECOMMUNICATIONS RESEARCH INSTITUTE, Daejeon (KR)

(72) Inventor: Hye Jin Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 62 days.

(21) Appl. No.: 15/017,109

(22) Filed: Feb. 5, 2016

(65) Prior Publication Data
US 2016/0231822 A1    Aug. 11, 2016

(30) Foreign Application Priority Data
Feb. 5, 2015 (KR) .................. 10-2015-0017967

(51) Int. Cl.
*G06F 3/01* (2006.01)
*G06F 3/0481* (2013.01)

(52) U.S. Cl.
CPC .............. *G06F 3/017* (2013.01); *G06F 3/011* (2013.01); *G06F 3/04815* (2013.01)

(58) Field of Classification Search
None
See application file for complete search history.

(56) References Cited

U.S. PATENT DOCUMENTS

2007/0132722 A1    6/2007    Kim et al.
2011/0096072 A1*   4/2011    Kim .................. G06F 3/017
                                                 345/419
(Continued)

FOREIGN PATENT DOCUMENTS

KR    1020110068512 A    6/2011
KR    10-2013-0049152 A    5/2013
(Continued)

OTHER PUBLICATIONS

Notice of Allowance dated Dec. 1, 2017 of the KR Patent Application No. 10-2015-0017967 which corresponds to the above-referenced U.S. application.

*Primary Examiner* — Christopher Kohlman
(74) *Attorney, Agent, or Firm* — LRK Patent Law Firm (57) ABSTRACT

Provided are a three-dimensional (3D) interaction apparatus and method for providing a user interaction service for a 3D image. The 3D interaction apparatus includes a memory including computer-executable instructions, a processor configured to read and execute the computer-executable instructions, an action calculator configured to calculate 3D action information corresponding to an action of a user, a mapping information calculator configured to calculate a manipulation position in a coordinate system of the 3D image matching each of coordinate values of the 3D action information, based on the 3D action information and 3D information of each of features of the 3D image, and an interaction controller configured to, when an arbitrary image processing request based on an action of a user is made for the calculated manipulation position, perform a corresponding image processing operation and display a 3D image obtained through the performed image processing operation.

13 Claims, 4 Drawing Sheets

(56) References Cited

U.S. PATENT DOCUMENTS

2013/0117717 A1    5/2013   Song et al.
2013/0222427 A1    8/2013   Heo et al.
2014/0181755 A1    6/2014   Oh et al.

FOREIGN PATENT DOCUMENTS

KR    10-2014-0080221 A    6/2014
KR    1020140076736 A    6/2014

\* cited by examiner

3D DISPLAY

MAPPING TYPE THREE-DIMENSIONAL INTERACTION APPARATUS AND METHOD

CROSS-REFERENCE TO RELATED APPLICATIONS

This application claims priority under 35 U.S.C. § 119 to Korean Patent Application No. 2015-0017967, filed on Feb. 5, 2015, the disclosure of which is incorporated herein by reference in its entirety.

BACKGROUND OF THE INVENTION

1. Field of the Invention

The present invention relates to a three-dimensional (3D) interaction apparatus and method, and more particularly, to a mapping type 3D interaction apparatus and method for providing a natural user interface (UI).

2. Description of Related Art

A related art interaction apparatus is mainly configured based on a two-dimensional (2D) display. Also, a result of an interaction is two-dimensionally expressed.

Recently, as 3D displays such as multi-viewpoint displays or holograms advance, requirements for a 3D-based interaction method are increasing. However, if a 2D-based interaction method of the related art is applied to a 3D display, a 3D effect is reduced, or an unnatural interaction result is caused.

SUMMARY

Accordingly, the present invention provides a 3D interaction apparatus and method for providing a natural interaction with a 3D object without a visual condition.

The present invention also provides a 3D interaction apparatus and method for providing a 3D interaction even without measuring a distance between a user and a 3D object.

The present invention also provides a 3D interaction apparatus and method which enable a user to feel three-dimensionality and reality.

The objects of the present invention are not limited to the aforesaid, but other objects not described herein will be clearly understood by those skilled in the art from descriptions below.

In one general aspect, a three-dimensional (3D) interaction apparatus for providing a user interaction service for a 3D image includes: a memory including computer-executable instructions, a processor configured to read and execute the computer-executable instructions; an action calculator configured to calculate 3D action information corresponding to an action of a user; a mapping information calculator configured to calculate a manipulation position in a coordinate system of the 3D image matching each of coordinate values of the 3D action information, based on the 3D action information and 3D information of each of features of the 3D image; and an interaction controller configured to, when an arbitrary image processing request based on an action of a user is made for the calculated manipulation position, perform a corresponding image processing operation and display a 3D image obtained through the performed image processing operation.

The 3D interaction apparatus may further include a 3D information provider configured to provide the 3D information of each of the features of the 3D image to the mapping information calculator. The 3D information of each of the features of the 3D image may include at least one of an edge and a corner which are included in the 3D image.

The action calculator may recognize the action of the user to calculate the 3D action information corresponding to the action of the user.

The action calculator may recognize a movement of a predetermined part of the user to generate the 3D action information about the movement of the predetermined part.

The 3D interaction apparatus may further include a mapping variable calculator configured to check an interaction range recognized by the user in the 3D image, based on the 3D action information.

The mapping variable calculator may adjust the interaction range, based on the 3D action information corresponding to the action of the user which has been changed after the 3D image changed by the interaction controller is displayed.

The mapping information calculator may calculate the manipulation position, based on the 3D action information and the 3D information of each of features of the 3D image within the interaction range.

The mapping information calculator may calculate the manipulation position by calculating correspondence relation information between a depth and size function "$z=f(x, y)$" of all 3D objects in each of frames of the 3D image and a depth and size function "$z'=g(x', y')$" of a 3D object within the interaction range.

The mapping information calculator may calculate the manipulation position, based on at least one of a shift degree of a depth value of the 3D action information corresponding to each of the features of the 3D image and a movement degree of a two-dimensional (2D) position.

In another general aspect, a three-dimensional (3D) interaction method of providing, by a processor, a user interaction service for a 3D image includes: calculating 3D action information corresponding to an action of a user; calculating a manipulation position in a coordinate system of the 3D image matching each of coordinate values of the 3D action information, based on the 3D action information and 3D information of each of features of the 3D image; and when an arbitrary image processing request based on an action of a user is made for the calculated manipulation position, performing a corresponding image processing operation; and displaying a 3D image obtained through the performed image processing operation.

The 3D interaction method may further include providing the 3D information of each of the features of the 3D image, wherein the 3D information of each of the features of the 3D image may include at least one of an edge and a corner which are included in the 3D image.

The calculating may include recognizing a movement of a predetermined part of the user to calculate the 3D action information about the movement of the predetermined part.

The 3D interaction method may further include checking an interaction range recognized by the user in the 3D image, based on the 3D action information.

The checking of the interaction range may include adjusting the interaction range, based on the 3D action information which is calculated after the displaying is performed.

The calculating of the manipulation position may include calculating the manipulation position, based on the 3D action information and the 3D information of each of features of the 3D image within the interaction range.

The calculating of the manipulation position may include calculating the manipulation position by calculating correspondence relation information between a depth and size function "$z=f(x, y)$" of all 3D objects in each of frames of the 3D image and a depth and size function "$z'=g(x', y')$" of a 3D object within the interaction range.

The calculating of the manipulation position may include calculating the manipulation position, based on at least one of a shift degree of a depth value of the 3D action information corresponding to each of the features of the 3D image and a movement degree of a two-dimensional (2D) position.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
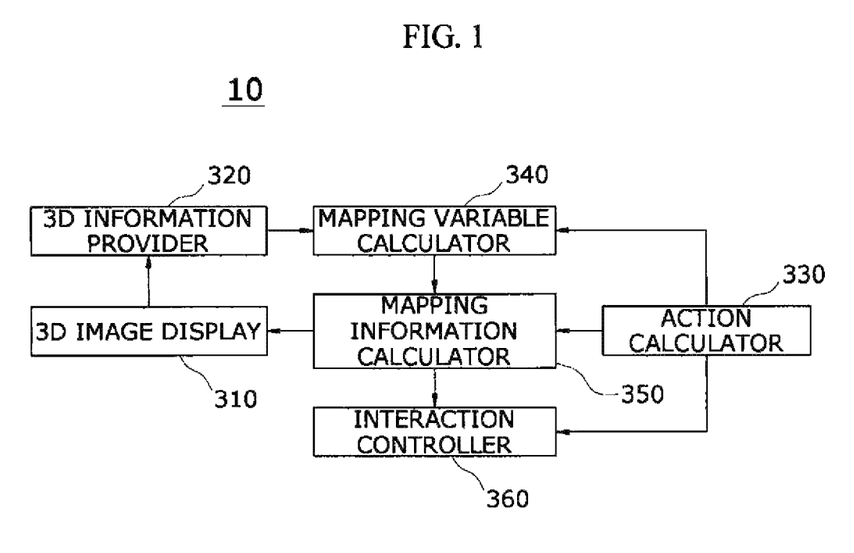
FIG. 1 is a block diagram illustrating a mapping type 3D interaction apparatus according to an embodiment of the present invention.
Figure 2A:
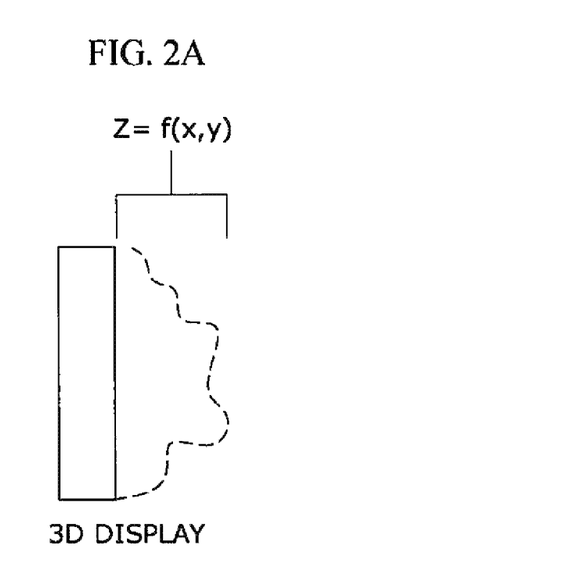
FIGS. 2A and 2B are diagrams an example of a user action according to an embodiment of the present invention.
Figure 2B:
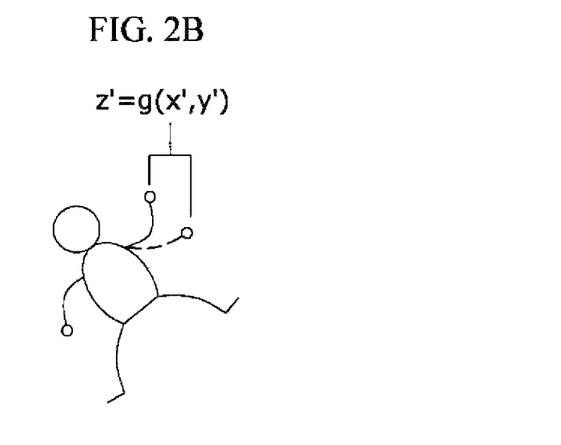

FIG. 1 is a block diagram illustrating a mapping type 3D interaction apparatus 10 according to an embodiment of the present invention. FIGS. 2A and 2B are diagrams an example of a user action according to an embodiment of the present invention.

As illustrated in FIG. 1, the mapping type 3D interaction apparatus 10 according to an embodiment of the present invention may include a 3D image display 310, a 3D information provider 320, an action calculator 330, a mapping variable calculator 340, a mapping information calculator 350, and an interaction controller 360.

The 3D image display 310 may display a 3D image according to control by the interaction controller 360.

Moreover, the 3D image display 310 may be one of various display devices. For example, the 3D image display 310 may be an autostreoscopic display using a parallax barrier or a lenticular lens. Alternatively, the 3D image display 310 may be a volumetric 3D display using integral imaging or a hologram.

The 3D information provider 320 may provide feature information, including singular information of a 3D image displayed by the 3D image display 310, and 3D information of each of features. Here, the singular information may be information that indicates a position or a depth of a 3D image like an edge or a corner of the 3D image.

For example, the 3D information provider 320 may be a storage means that stores each feature information of a 3D image and 3D information of each feature. Also, the 3D information provider 320 may be a processing means that checks and provides feature information of a 3D image and 3D information of each feature before and after displaying the 3D image.

The action calculator 330 may recognize an action of a user and may calculate 3D action information corresponding to the action of the user.

In detail, the action calculator 330 may recognize an action of at least one predetermined part of the user and may calculate 3D information about the recognized action.

The at least one predetermined part may be an interaction means selected by the user, and for example, may be a hand. To this end, the mapping type 3D interaction apparatus 10 may provide a selection interface of an interaction means to the user. For example, a user whose a hand is uncomfortable may select a foot or a tongue as an interaction means. Hereinafter, a case where at least one predetermined body part is set as one hand will be described as an example.

For example, the action calculator 330 may include at least one of a 3D depth camera, an inertial measurement unit (IMU), an ultrasound sensor, and an iris sensor.

The action calculator 330 may generate 3D action information, and in this case, the action calculator 330 may not use 3D information of a 3D image. In other words, the action calculator 330 may not know the 3D information of the 3D image.

The mapping variable calculator 340 may check a position of the hand of the user from the 3D action information and may check, from the 3D image, an interaction range based on recognition by the user by using an action of the hand of the user. In detail, the mapping variable calculator 340 may check, from the 3D action information, a position of the hand of the user and a range of a movement of the user (see FIG. 2B) to check, the whole 3D image, an interaction range based on recognition by the user. In this case, the mapping variable calculator 340 may determine a variable that is used to make an x change, a y change, and a z change caused by a movement checked from the 3D action information correspond to an x change, a y change, and a z change of a virtual reality coordinate system. The mapping type variable calculator 340 may express the interaction range in a Decartesian-coordinate system form like "area R=A(x', y', z')". Here, the mapping variable calculator 340 may use a repetitive movement of an action of the user, for determining the interaction range.

The mapping variable calculator 340 may widen or narrow the interaction range by using a range of a movement of the hand of the user which has been changed according to a previous interaction result. For example, the interaction controller 360 may perform an interaction, based on the 3D action information. Subsequently, when the movement of the hand of the user is expanded, the interaction controller 360 may widen the interaction range in comparison with a previous interaction range. On the other hand, when the movement of the hand of the user is reduced, the interaction controller 360 may narrow the interaction range in comparison with a previous interaction range.

In other words, a coordinate value of a specific part or a specific range which is recognized as being selected from a 3D image by each user may have a difference with a coordinate value of an actual 3D image. In order to solve the difference, the mapping variable calculator 340 may change the interaction range, based on a movement change of the hand of the user and an after-interaction movement change of the hand of the user. For example, when a user moves while moving a hand within a range of 10 cm of an x coordinate, the mapping variable calculator 340 may set, as successively moving within a range of 5 cm of the x coordinate, an interaction range in a 3D virtual reality coordinate system corresponding to the movement. In this case, the user may subsequently widen a range in which the hand moves, and thus, the mapping variable calculator 340 may further widen the interaction range to the widened range. Subsequently, the mapping variable calculator 340 may further widen the interaction range by moving the hand of the user by a distance of 10 cm. As described above, according to the present embodiment, as an interaction between the user and the 3D image is progressively performed, the interaction range is optimized according to a recognition range of the user.

As described above, the mapping variable calculator 340 may determine an interaction range, which is to be matched with the 3D action information of the user, in the virtual reality coordinate system.

The mapping information calculator 350 may calculate a manipulation position in the virtual reality coordinate system of the 3D image matching each coordinate value of the 3D action information within the interaction range in the virtual reality coordinate system, based on the 3D action information and 3D information of each feature of the 3D image.

In detail, the mapping information calculator 350 may calculate correspondence relation information between "z=f(x, y)", which is a depth and size function of all 3D objects in each frame of the 3D image as illustrated in FIG. 2A, and "z'=g(x', y')" that is a depth and size function of 3D information of each feature within an interaction range as illustrated in FIG. 2B. Also, the mapping information calculator 350 may determine a manipulation position of the hand of the user, based on the calculated correspondence relationship information. For reference, in FIG. 2B, a function "z'" when the hand of the user moves upward and downward is described as an example.

In this case, the mapping information calculator 350 may check at least one of a shift degree of a depth value of 3D action information and a movement degree of a 2D position, based on a current movement of the hand of the user compared with a previous movement of the hand within the interaction range (for example, with respect to a periphery of an edge). Also, the mapping information calculator 350 may calculate a manipulation position of the hand of the user, based on the checked at least one.

When an image processing action based on at least one of a user request and a movement of the hand of the user is selected based on the calculated manipulation position, the interaction controller 360 may execute the selected image processing action and may display a 3D image, changed by image processing, in the 3D image display 310. Here, the user request may be a user request based on a movement of the hand of the user.

In the above-described embodiment, a case where the action calculator 330 calculates 3D action information of a hand which is one predetermined part of a user has been described as an example. However, the action calculator 330 may generate 3D action information by using movements of two or more parts of the user.

For example, the action calculator 330 may generate 3D action information about movements of both hands. As another example, the action calculator 330 may additionally check eye-gaze information including at least one of a position of a pupil and a direction at which the pupil looks and may generate 3D action information, including eye-gaze information, about movements of two parts of the user. In a case of additionally using the eye-gaze information, the mapping variable calculator 340 may determine an interaction range, based on both the eye-gaze information and a position of the hand of the user.

Moreover, in the above-described embodiment, the mapping variable calculator 340, the mapping information calculator 350, and the interaction controller 360 may be included in one processor such as a central processing unit (CPU), or may be implemented as different processors.

That is, the elements according to an embodiment of the present invention may be driven by a processor that executes a program stored in a memory.

Here, the memory may be a generic name for a nonvolatile storage device, which continuously maintains stored information even when power is not supplied thereto, and a volatile storage device.

For example, examples of the memory may include NAND flash memory such as compact flash (CF) card, secure digital (SD) card, memory stick, solid-state drive (SSD), and micro SD card, a magnetic computer memory device such as hard disk drive (HDD), and optical disk drive such as CD-ROM and DVD-ROM.

Moreover, in the above-described embodiment, the action calculator 330 may further sense a speed of a user action, and the mapping variable calculator 340, the mapping information calculator 350, and the interaction controller 360 may provide an interaction service, based on the speed of the user action.

As described above, in an embodiment of the present invention, a natural interaction with a 3D object is provided by using a mapping variable and a function that are determined based on a natural action of a user without a visual cue or a visual indicator.

Moreover, in an embodiment of the present invention, a natural interaction is provided by reflecting a degressive distance of a user with respect to a 3D image even without measuring a distance between the user and a 3D display or a 3D object.

Furthermore, in an embodiment of the present invention, an error where a detection position is changed depending on the eyes, arm lengths, or recognitions of users is appropriately corrected by mapping a recognition distance of a user and a relative distance to a 3D object.

For reference, the elements of FIG. 1 according to an embodiment of the present invention may be implemented in a hardware type such as a field programmable gate array (FFGA) or an application specific integrated circuit (ASIC) and may perform certain functions.

However, the elements are not limited to software or hardware. In other embodiments, each of the elements may be implemented in an addressing-enabled storage medium or may be implemented to reproduce one or more processors.

Therefore, for example, the elements may include software elements, object-oriented software elements, class elements, and task elements and may include processes, functions, attributes, procedures, subroutines, segments of a program code, drivers, firmware, micro codes, circuits, data, databases, data structures, tables, arrays, and variables.

The elements and functions performed by the elements may be combined into a smaller number of elements or may be further divided into additional elements.

Figure 3:
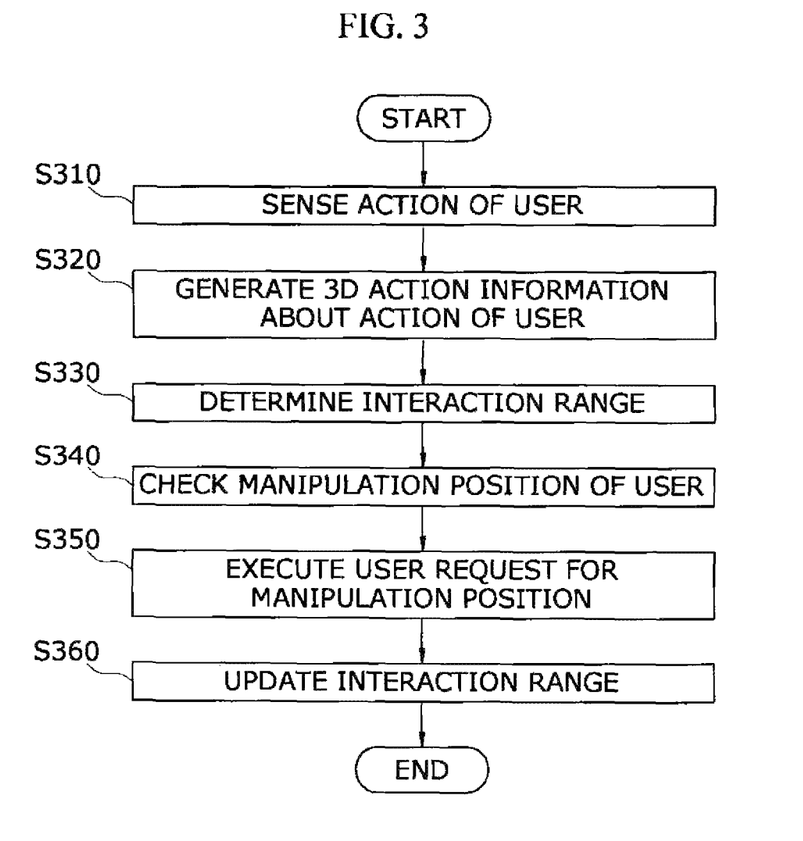
FIG. 3 is a block diagram illustrating a mapping type 3D interaction method according to an embodiment of the present invention.

Hereinafter, a mapping type 3D interaction method according to an embodiment of the present invention and its detailed example will be described with reference to FIGS. 3 and 4. FIG. 3 is a block diagram illustrating a mapping type 3D interaction method according to an embodiment of the present invention. FIGS. 4A and 4B are diagrams illustrating a 3D image according to an embodiment of the present invention. Hereinafter, a case where a 3D image is a vehicle and a user request corresponds to an operation of painting the vehicle will be described as an example.

When a user makes a hand action of successively moving a hand for painting within a range where a surface of the vehicle is to be painted, an action of successively moving the hand of the user may be sensed in step S310. Hereinafter, for convenience of description, a case where a predetermined body part is one hand of a user will be described as an example.

In step S320, the action calculator 330 may calculate 3D action information about a movement of a hand with respect to a predetermined original point.

In step S330, the mapping variable calculator 340 may check, from the 3D action information, 3D information about a position of the hand of the user and a movement range of the hand and may determine an interaction range recognized by the user in the whole 3D image.

In step S340, the mapping information calculator 350 may check a position, at which image processing (for example, painting) is to be performed by the user, by using a correspondence relationship between a depth and size function of all 3D objects in one frame of the 3D image and a depth and size function of a feature within an interaction range.

In step S350, the interaction controller 360 may paint a checked manipulation position of a vehicle surface in a predetermined color according to a user request and may display a painted 3D vehicle image, which has been painted at the manipulation position as a result of the painting, in the 3D image display 310.

Subsequently, in step S360, the mapping variable calculator 340 may change an interaction range, based on a movement range of the hand of the user which has been changed after the user request is executed. In detail, the mapping variable calculator 340 may check a shift degree of the movement range where a movement of the hand of the user is enlarged or changed.

According to an implementation example of the present invention, steps S310 to S360 may be further divided into additional steps, or may be combined into a smaller number of steps. Also, some steps may be omitted depending on the case, and the sequence of steps may be changed. Furthermore, despite other omitted details, the details of the mapping type 3D interaction apparatus 10 described above with reference to FIGS. 1 and 2 may be applied to the mapping type 3D interaction method of FIG. 3.

Figure 4A:
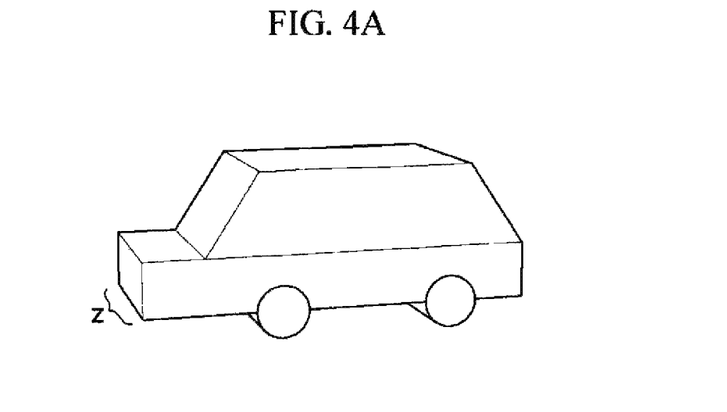
FIGS. 4A and 4B are diagrams illustrating a 3D image according to an embodiment of the present invention.
Figure 4B:
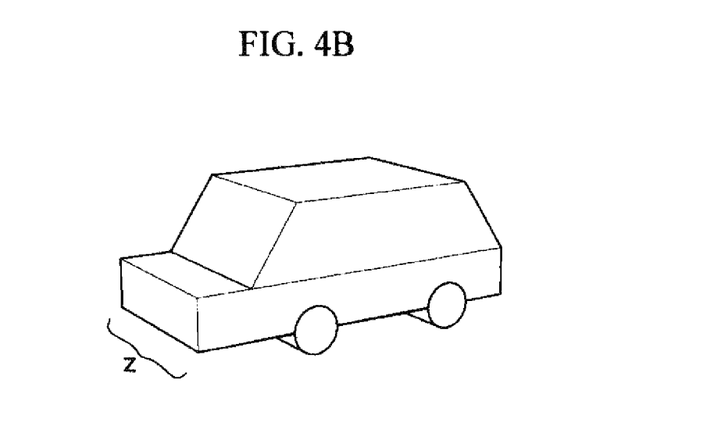

Referring to FIGS. 4A and 4B, a user may look at the same 3D image as illustrated in FIG. 4A or FIG. 4B, based on the eyes, height, and position of the user. Therefore, there may be a difference between an interaction range, felt by a first user which looks as the 3D image as illustrated in FIG. 4A, and an interaction range felt by a second user which looks as the 3D image as illustrated in FIG. 4B.

Furthermore, when a user paints a vehicle in a z direction, each user may paint the vehicle by moving its own hand within a distance in a z' direction that is a z direction felt by each user, and thus, values of z may differ by users.

However, when a value of z' is measured by a sensor or the like and is applied to a 3D image as-is, an error can occur due to the eyes, arm length, height, and recognition ability of a user. Also, in an embodiment of the present invention, the error is reduced by progressively matching a recognition distance of a user with a distance in a 3D image.

As described above, in an embodiment of the present invention, a natural interaction service with a 3D image or a hologram type 3D object is provided even without a visual cue or a visual indicator.

Moreover, in an embodiment of the present invention, a 3D interaction is provided by analogizing a recognition range of a user with respect to a 3D image even without measuring a distance between the user and a 3D display or a 3D object.

Furthermore, in an embodiment of the present invention, an error where a detection position is changed depending on the eyes, arm lengths, or recognitions of users is appropriately corrected by mapping a recognition distance of a user and a relative distance to a 3D object.

Furthermore, an embodiment of the present invention may be applied to various fields such as the things Internet field, the smart home, the game industry, etc.

The mapping type 3D interaction method performed by the mapping type 3D interaction apparatus 10 according to the embodiment of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiment of the present invention have been described in association with a specific embodiment, but their elements, some operations, or all operations may be implemented by using a computer system having general-use hardware architecture.

As described above, according to the embodiments of the present invention, the 3D interaction apparatus and method provide a natural interaction with a 3D object without a visual cue.

Moreover, according to the embodiments of the present invention, the 3D interaction apparatus and method provide a 3D interaction even without measuring a distance between a user and a 3D object.

Moreover, according to the embodiments of the present invention, a user feels three-dimensionality and reality.

A number of exemplary embodiments have been described above, Nevertheless, it will be understood that various modifications may be made. For example suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) interaction apparatus for providing a user interaction service for a 3D image, the 3D interaction apparatus comprising:
    a memory including computer-executable instructions;
    a processor configured to read and execute the computer-executable instructions;
    an action calculator configured to calculate 3D action information corresponding to an action of a user by interaction means selected by the user;
    a mapping variable calculator configured to determine an interaction range recognized by the user in the 3D image by checking a position of the interaction means and a movement range of the interaction means from the 3D action information, and to widen or narrow the interaction range using a movement range of the interaction means which has been changed according to a previous interaction result;
    a mapping information calculator configured to calculate a manipulation position in a coordinate system of the 3D image which matches each of coordinate values of the 3D action information, based on the 3D action information, the interaction range, and 3D information of each of features of the 3D image within the interaction range; and
    an interaction controller configured to, when an image processing request for the calculated manipulation position is made based on an action of the user, perform the image processing operation and display a 3D image obtained through the image processing operation.

2. The 3D interaction apparatus of claim 1, further comprising:
    a 3D information provider configured to provide the 3D information of each of the features of the 3D image to the mapping information calculator,
    wherein the 3D information of each of the features of the 3D image comprises at least one of an edge and a corner which are included in the 3D image.

3. The 3D interaction apparatus of claim 1, wherein the action calculator recognizes the action of the user to calculate the 3D action information corresponding to the action of the user.

4. The 3D interaction apparatus of claim 1, wherein the action calculator recognizes a movement of a predetermined part of the user and generates the 3D action information about the movement of the predetermined part.

5. The 3D interaction apparatus of claim 1, wherein the mapping variable calculator widens or narrows the interaction range, based on the 3D action information corresponding to the action of the user which has been changed after the 3D image changed by the interaction controller is displayed.

6. The 3D interaction apparatus of claim 1, wherein mapping information calculator calculates the manipulation position by calculating correspondence relation information between a depth and size function of all 3D objects in each of frames of the 3D image and a depth and size function of a 3D object within the interaction range.

7. The 3D interaction apparatus of claim 1, wherein the mapping information calculator calculates the manipulation position, based on at least one of a shift degree of a depth value of the 3D action information corresponding to each of the features of the 3D image and a movement degree of a two-dimensional (2D) position.

8. A three-dimensional (3D) interaction method of providing, by a processor, a user interaction service for a 3D image, the 3D interaction method comprising:
    calculating 3D action information corresponding to an action of a user by interaction means selected by the user;
    determining an interaction range recognized by the user in the 3D image by checking a position of the interaction means and a movement range of the interaction means from the 3D action information;
    widening or narrowing the interaction range using a movement range of the interaction means which has been changed according to a previous interaction result;
    calculating a manipulation position in a coordinate system of the 3D image which matches each of coordinate values of the 3D action information, based on the 3D action information, the interaction range, and 3D information of each of features of the 3D image within the interaction range; and
    when an image processing request for the calculated manipulation position is made based on an action of the user, performing the image processing operation; and
    displaying a 3D image obtained through the image processing operation.

9. The 3D interaction method of claim 8, further comprising:
    providing the 3D information of each of the features of the 3D image,
    wherein the 3D information of each of the features of the 3D image comprises at least one of an edge and a corner which are included in the 3D image.

10. The 3D interaction method of claim 8, wherein the calculating comprises recognizing a movement of a predetermined part of the user to calculate the 3D action information about the movement of the predetermined part.

11. The 3D interaction method of claim 8, wherein the determining of the interaction range comprises widening or narrowing the interaction range, based on the 3D action information which is calculated after the displaying is performed.

12. The 3D interaction method of claim 8, wherein the calculating of the manipulation position comprises calculating the manipulation position by calculating correspondence relation information between a depth and size function of all 3D objects in each of frames of the 3D image, and a depth and size function of a 3D object within the interaction range.

13. The 3D interaction method of claim 8, wherein the calculating of the manipulation position comprises calculating the manipulation position, based on at least one of a shift degree of a depth value of the 3D action information corresponding to each of the features of the 3D image and a movement degree of a two-dimensional (2D) position.

* * * * *